(12) United States Patent
Barr et al.

(10) Patent No.: US 7,191,356 B2
(45) Date of Patent: Mar. 13, 2007

(54) METHOD FOR ASYNCHRONOUS SUPPORT OF FAULT-TOLERANT AND ADAPTIVE COMMUNICATION

(75) Inventors: Terrence Barr, Cupertino, CA (US); Shivakumar Govindarajapuram, Santa Clara, CA (US); Peter Strarup Jensen, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 615 days.

(21) Appl. No.: 10/377,965

(22) Filed: Feb. 27, 2003

(65) Prior Publication Data

US 2004/0193941 A1 Sep. 30, 2004

(51) Int. Cl.
*G06F 11/00* (2006.01)
(52) U.S. Cl. .......................................... 714/4; 370/227
(58) Field of Classification Search ...................... 714/4; 370/227
See application file for complete search history.

(56) References Cited

U.S. PATENT DOCUMENTS

| | | | | |
|---|---|---|---|---|
| 5,751,719 A | * | 5/1998 | Chen et al. | 370/473 |
| 5,754,754 A | * | 5/1998 | Dudley et al. | 714/18 |
| 5,835,721 A | * | 11/1998 | Donahue et al. | 709/224 |
| 5,892,894 A | * | 4/1999 | Shiroshita et al. | 714/4 |
| 5,999,979 A | * | 12/1999 | Vellanki et al. | 709/232 |
| 6,175,933 B1 | * | 1/2001 | Cadden | 714/15 |
| 6,396,805 B2 | * | 5/2002 | Romrell | 370/216 |
| 6,526,049 B1 | * | 2/2003 | Murata | 370/389 |

OTHER PUBLICATIONS

Victor C. Zandy, Barton P. Miller, Reliable network connections, Proceedings of the 8th annual international conference on Mobile computing and networking, pp. 95-106, Sep. 23-28, 2002, Atlanta, Georgia, USA.*

* cited by examiner

*Primary Examiner*—Bryce P. Bonzo
(74) *Attorney, Agent, or Firm*—Martine Penilla & Gencarella LLP (57) ABSTRACT

An invention is provided for affording asynchronous fault-tolerant and adaptive communication in a distributed computing environment. The invention includes periodically updating a stored connection state value, which is received from an application. The connection state value indicates the number of data elements processed by the application. An interruption in a digital connection is then detected on a network between two endpoints. Upon detection, the stored connection state value is exchanged with the opposite endpoint over the network. In this manner, remaining data elements of the transaction can be received sequentially over the network from the opposite endpoint. In particular, the remaining data elements begin with a data element at a point indicated by the connection state value plus one.

20 Claims, 8 Drawing Sheets

METHOD FOR ASYNCHRONOUS SUPPORT OF FAULT-TOLERANT AND ADAPTIVE COMMUNICATION

CROSS REFERENCE TO RELATED APPLICATIONS

This application is related to U.S. patent application Ser. No. 10/378,005, filed Feb. 27, 2003, and entitled "Method for Synchronous Support of Fault-Tolerant and Adaptive Communication," which is incorporated herein by reference.

BACKGROUND OF THE INVENTION

1. Field of the Invention

This invention relates generally to computer networking, and more particularly to application and protocol independent asynchronous support of fault tolerant and adaptive communication using commit techniques.

2. Description of the Related Art

With the increased use of mobile and remote computing, distributed processing has become a central element in many computer processing systems. Distributed processing has many different forms depending on the nature of the data and the objectives of the application. For example, one emerging form of distributed processing is mobile computing, such as used in telematics.

Telematics refers to systems used for communications, instrumentation, control, and information technology in the field of transportation. Over the years, manufacturers of on-road vehicles, such as automobiles, vans, trucks, buses, and so on, have utilized computer technology to enhance the operations of existing features and functions in the vehicles as well as to provide new features and functions. For example, programmed controllers, custom-designed processors, embedded systems, and/or computer modules have been developed that support or even control various kinds of mechanical equipment in vehicles. For example, programmed controllers or computer modules have been developed that control or support various engine functions, such as fuel injection, timing, and so on. Programmed controllers or computer modules have been developed to enhance or support operation of transmission systems, suspension systems, braking systems, and so on. The sophistication of these enhancements has advanced as the processing power available for these purposes has increased. It is expected that in the future more aspects of the mechanical equipment in vehicles will be controlled or supported by processors or controllers in order to enhance performance, reliability, safety, and to reduce emissions.

As can be appreciated, the distributed nature of telematic functions generally requires a digital distributed communication structure such as that provided in distributed computing environments. However, as with most communication, digital communication is subject to interruption or failure. As such, an ability to restart communication after interruption is important to most distributed applications.

Figure 1:
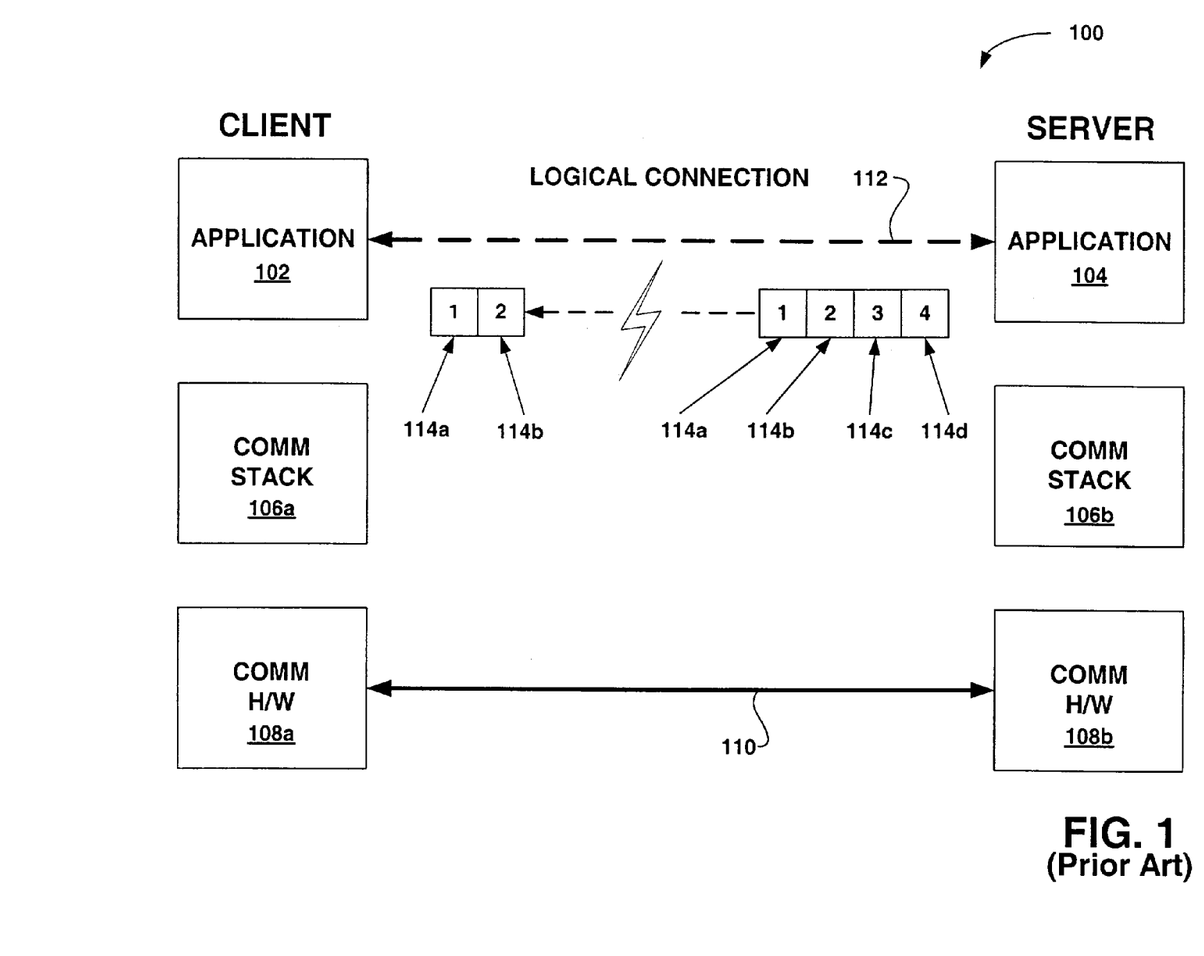
FIG. 1 is a block diagram showing a typical prior art distributed environment.

FIG. 1 is a block diagram showing a typical prior art distributed environment 100. The distributed environment 100 includes a client application 102 executing on a client device, which is in communication with a server application 104 executing on a server device. Generally, the client application 102 and server application 104 communicate using a logical connection 112, which is a logical entity used by applications to exchange data between two endpoints, such as the client application 102 and the server application 104. Although the application programs 102 and 104 function as though the logical connection 112 were a physical entity, the logical connection 112 requires a communication channel to actually transmit data.

Software known as the communication stack 106a and 106b is used to map logical connections to communication channels, which includes the actual communication hardware 108a and 108b. The communication stacks 106a and 106b handle data routing, flow control, buffering, error correction, and other computing issues encountered in real-world communication. Entities, such as the client application 102 and the server application 104, use one or more logical connections 112 to communicate with other entities by sending and receiving data in a sequential fashion over a period of time. Due to the sequential nature of the communication, data communication typically is stateful, meaning that the completeness and order of the data transmitted should be preserved.

However, the flow of data over a connection can be interrupted for many reasons, such as the failure of the underlying communication hardware 108a and 108b or because the connection is rerouted to a more advantageous communication channel. During such interruptions data may be lost, corrupted, or reordered. In order to continue communication once the channel has been reestablished, a method should be in place that restarts data transfer. Unfortunately, many prior art systems restart lost connections from the beginning of the data transaction, thus re-transmitting the entire transaction.

For example, in FIG. 1, the server application 104 begins sending data elements 1 114a, 2 114b, 3 114c, and 4 114d to the client application 102. However, during the transmission the logical connection 112 between the server application 104 and the client application 102 is interrupted. As a result, the client application 102, in this example, received only two data elements, 1 114a and 2 114b, of the four data elements transmitted. Once the connection is reestablished, the prior art distributed environment 100 will restart the entire transmission beginning again with data element 1 114a, thus re-transmitting the entire transaction.

If the connection state of the transaction was maintained when interruption occurred, the transaction can be restated at the point of the interruption. For example, in FIG. 1, the server application 104 can begin re-transmitting from data element 3 114c and continue the remainder of the transaction, instead of re-transmitting from the beginning of the transaction with data element 1 114a. However, prior art solutions to obtaining and maintaining connection state information for restarting after connection interruptions have been overly burdensome and inconsistent.

For example, some prior art systems have attempted to make fault tolerant logical connections transparent to the applications by implementing all the fault tolerant functionality in the communication stack 106a and 106b. However, these systems are overly complex, burdensome, and inconsistent because the communication stack 106a and 106b is required to perform buffering, keep track of how much data was sent and received from each endpoint, and keep track of what data was lost. Since the communication stack 106a and 106b cannot determine what data is actually important to a particular application, the communication stack 106a and 106b must have the functionality to track all data, and store all network information regarding the state of the connection.

To avoid such complexity, some prior art distributed systems shift the burden of fault tolerant communication entirely to the applications. Unfortunately, different applications can implement fault tolerant schemes in different ways, causing inconsistency and requiring greater care in developing distributed software for existing distributed applications. Moreover, different applications will require similar functions because they must be able to handle the same communication scenario. This causes waste, in terms of duplication effort, and additional implementation inconsistencies.

In view of the foregoing, there is a need for a method for supporting fault tolerant and adaptive communication that promotes consistency and reduced complexity. The method should allow reestablished connections to restart from the point where interruption occurred, and should be independent of the communication protocol, the format of the data transmitted, and any application policies.

SUMMARY OF THE INVENTION

Broadly speaking, the present invention fills these needs by providing asynchronous support of fault-tolerant and adaptive communication using an application commit of its connection state. Broadly speaking, embodiments of the present invention utilize control layers, which provide fault tolerant connectivity to applications. The control layers at each endpoint exchange connection state information with each other that allows connections to restart from the point where an interruption occurred. In one embodiment, a method is disclosed for providing asynchronous fault-tolerant and adaptive communication in a distributed computing environment. The method includes periodically updating a stored connection state value, which is received from an application. The connection state value indicates the number of data elements processed by the application. An interruption in a digital connection is then detected on a network between two endpoints. The digital connection is utilized to transmit data elements of a transaction sequentially from an opposite endpoint to an application. Upon detection, the stored connection state value is exchanged with the opposite endpoint over the network. In this manner, remaining data elements of the transaction can be received sequentially over the network from the opposite endpoint. In particular, the remaining data elements begin with a data element at a point indicated by the connection state value plus one. The control layer communication can be in both directions. For example, the opposite connection state value indicating a number of data elements processed using the opposite endpoint can be received so that remaining data elements can be transmitted sequentially over the network to the opposite endpoint. As above, the remaining data elements can begin with a data element at a point indicated by the opposite connection state value plus one.

A computer program embodied on a computer readable medium for providing asynchronous fault-tolerant and adaptive communication in a distributed computing environment is disclosed in an additional embodiment of the present invention. The computer program includes a connection monitor module that detects interruptions in digital connections on a network between two endpoints. As above, the digital connection is utilized to transmit data elements of a transaction sequentially from an opposite endpoint to an application. The computer program also includes a commit table that stores a connection state value indicating the number of data elements processed by the application. As above, the connection state value is periodically updated during execution of the application. Further included is a reconnect protocol module that exchanges the connection state value with the opposite endpoint over the network. In this manner, the computer program allows remaining data elements of the transaction to be received sequentially over the network from the opposite endpoint such that the remaining data elements begin with a data element at a point indicated by the connection state value plus one. The computer program can also be utilized to facilitate changing communication channels during a digital transaction. For example, the connection monitor module can detect a $2^{nd}$ communication channel that is currently more efficient than a current $1^{st}$ communication channel. In this case, the connection monitor module can interrupt the digital connection on the current $1^{st}$ communication channel and re-map a logical connection to the $2^{nd}$ communication channel.

In a further embodiment, a distributed environment having asynchronous fault-tolerant and adaptive communication is disclosed. The distributed environment includes a client application in communication with a client control layer. In addition, a server application is included that is in communication with the client application over a logical connection. The logical connection is utilized to transmit data elements of a transaction sequentially from the client application to the server application. Also included is a server control layer having a table that stores a server connection state value indicating a number of data elements processed by the server application. The server control layer has a control connection with the client control layer. In addition, the server control layer exchanges a server connection state value with the client control layer using the control connection when the logical connection is interrupted. As above, the server connection state value indicates a number of data elements processed by the server application. In this manner, the client application can transmit remaining data elements of the transaction sequentially over the network beginning with a data element at a point indicated by the client connection state value plus one. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for asynchronous support of fault-tolerant and adaptive communication. Embodiments of the present invention provide fault-tolerant communication, which is independent of the underlying protocol and data format. Broadly speaking, embodiments of the present invention insert control layers in communication with the communication stack and the application that provide fault tolerant connectivity to applications. The application updates the control layer periodically with connection state information. In the event of a connection interruption, the control layers at each endpoint can exchange the connection state information with each other allowing connections to restart from the point where an interruption occurred. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
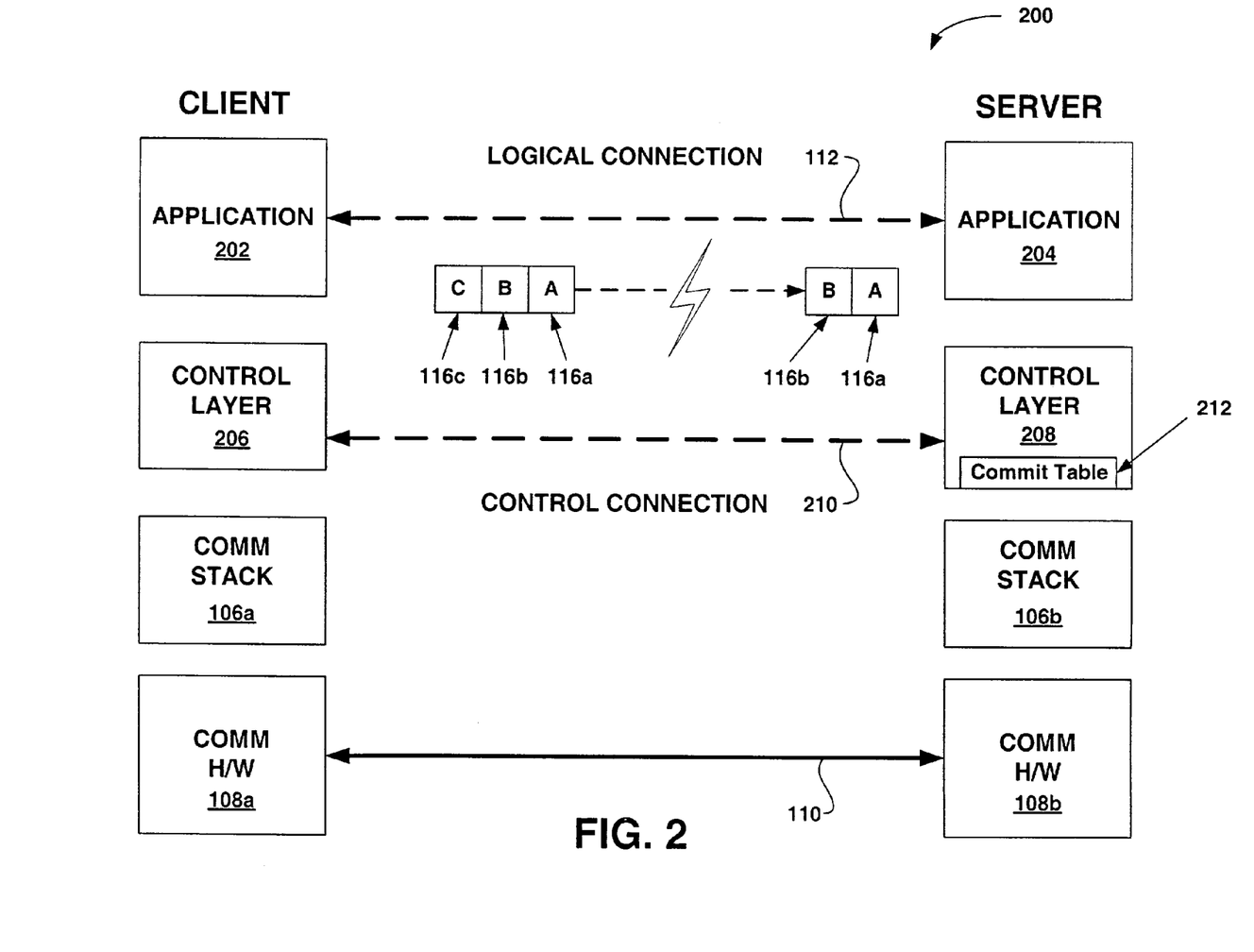
FIG. 2 is a block diagram showing a distributed computing environment having asynchronous fault-tolerance support for a one-way transaction, in accordance with an embodiment of the present invention.

FIG. 1 was described in terms of the prior art. FIG. 2 is a block diagram showing a distributed computing environment 200 having asynchronous fault-tolerance support for a one-way transaction, in accordance with an embodiment of the present invention. The distributed environment 200 includes a client application 202 executing on a client device, which is in communication with a server application 204 executing on a server device. As discussed previously, the client application 202 and server application 204 generally communicate using a logical connection 112, which is a logical entity used by applications to exchange data between two endpoints, such as the client application 202 and the server application 204. Although the application programs 202 and 204 function as though the logical connection 112 were a physical entity, the logical connection 112 requires a communication channel to actually transmit data.

The communication stacks 106a and 106b map logical connections to a communication channel 110, which includes the actual communication hardware 108a and 108b. As disclosed above, the communication stacks 106a and 106b handle data routing, flow control, buffering, error correction, and other computing issues encountered in real-world communication. Entities, such as the client application 202 and the server application 204, use one or more logical connections 112 to communicate with other entities by sending and receiving data in a sequential fashion over a period of time.

Embodiments of the present invention provide asynchronous support of fault-tolerant and adaptive communication using control layers 206 and 208, which are in communication with the applications 202 and 204 and the communication stacks 106a and 106b. In one embodiment, a client control layer 206 is placed in communication with the client application 202 and the client side communication stack 106a, and a server control layer 208 is placed in communication with the server application 204 and the server side communication stack 106b. In operation, the control layers 206 and 208 facilitate reconnection and transaction restarting from the point of interruption.

Broadly speaking, the control layer 208 periodically obtains a connection state value from the server applications 204 executing on the server device. As will be described in greater detail subsequently, the connection state values indicate the number of data elements processed by each application up to the point of the last commit, which is the last time the application provided a connection state value to the commit table. The data elements can be any discrete grouping of data, such as a byte of data, a group of data bytes, an object, a group of objects, or any other discrete data grouping utilized by an application.

Although FIG. 2 illustrates a single server application 204 executing on the server device, it should be noted that the control layer 208 can be utilized to facilitate fault tolerant communication with many different server applications 204 executing on the server device. To coordinate the applications 204, the control layer 208 utilizes a commit table 212. In general, the commit table 212 stores the latest connection state value update for each application the commit table 212 services. That is, each application 204 executing on the server device periodically provides the control layer 208 with the application's current connection state value, which is the number of data elements the application has processed up to the time of the update.

The commit table 212 includes an entry for each application using the control layer 208. Thus, upon receiving a connection state value update from an application, the control layer 208 stores the connection state value in the entry for the respective application in the commit table 212. Thereafter, when a connection interruption occurs, the control layers 206 and 208 can exchange connection state values with each other. In this manner, remaining data elements of the transaction can be sent sequentially over the network beginning with the data element at the point indicated by the connection state values plus one.

More particularly, during normal operation the client application 202 and server application 204 communicate with each other by sending data elements 116a–116c to each other via the logical connection 112. During this time the control layers 206 and 208 monitor the state of the connection. Upon detecting an interruption in the connection, the control layers 206 and 208 notify the applications 202 and 204 that an interruption has occurred. Once notified of the interruption, the applications can make appropriate responses.

In one embodiment, upon being notified of a connection interruption, the server application 204 can either quit or perform other operations. Since a typical server device services many client devices, the server device can conserve resources by terminating server applications that no longer have an active connection to a client application 202. In this case, the server application 204 can quit when notified of a connection interruption, and later restart when the connection has been restored. Because the connection state is stored in the server control layer 208, the restarted server application 204 can continue the digital transaction from the point where the connection terminated.

In FIG. 2, for example, the client application 202 is transmitting data elements A 116a, B 116b, and C 116c to the server application 204 using the logical connection 112. During the transmission the server application 204 periodically provides its connection state value to the server control layer 208, which updates the appropriate entry in the commit table 212 with the latest connection state value. At some point during the transmission an interruption occurs such that data can no longer be communicated over the logical connection 112. Upon detection of the connection interruption, the control layer 208 notifies the server application 204 of the interruption. In response, the server application 204 can either terminate or continue to perform other functions not requiring the interrupted connection, such as further computations or data transmissions with other client devices.

At this point, the client control layer 206 and the server control layer 208 establish a control connection 210 that allows the control layers 206 and 208 to communicate with each other. In one embodiment, the control layers 206 and 208 utilize the same communication stacks 106a–106b and communication hardware 108a–108b for digital communication as utilized by the applications 202 and 204. In additional embodiments, the control connection 210 is established over a different physical channel that can, in one embodiment, be specifically utilized for control communication only. Once the control connection 210 is established, the control layers exchange connection state values. For example, in FIG. 2, the server control layer 208 transmits the connection state value for the server application 204, obtained from the commit table 212, to the client control layer 206.

In the example of FIG. 2, the server application 202 processed data elements A 116a and B 116b prior to the connection interruption. During the transmission, the server application 204 periodically updates the server control layer 208 with its current connection state value. In this case, the server application 204 provides a connection state value of two to the server control layer 208. The connection state value of two indicates that the server application 204 has processed two data elements prior to the current update.

At this point an interruption occurs such that the server application 204 did not receive data element C 116c of the current transaction. Upon establishing the control connection 210, the server control layer 208 transmits the connection state value, in this example having a value of two, to the client control layer 206. The client control layer 206 then provides the connection state value information to the client application 202. Thereafter, the client control layer 206 passes control back to the client application 202 and the server control layer 208 passes control back to the server application 204.

Subsequently, the client application 202 can begin transmitting the remaining data elements of the transaction to the server application 204. In particular, the client application 202 begins transmitting from the data element at a point indicated by the connection state value plus one. In the example of FIG. 2, the client application 202 begins re-transmitting data starting from the third data element in the transaction (connection state value of two plus one), which is data element C 116c. Although the example of FIG. 2 illustrates a one-way transaction, embodiments of the present invention also support two-way transactions were data is being transmitted to both endpoints, as illustrated next with reference to FIG. 3.

Figure 3:
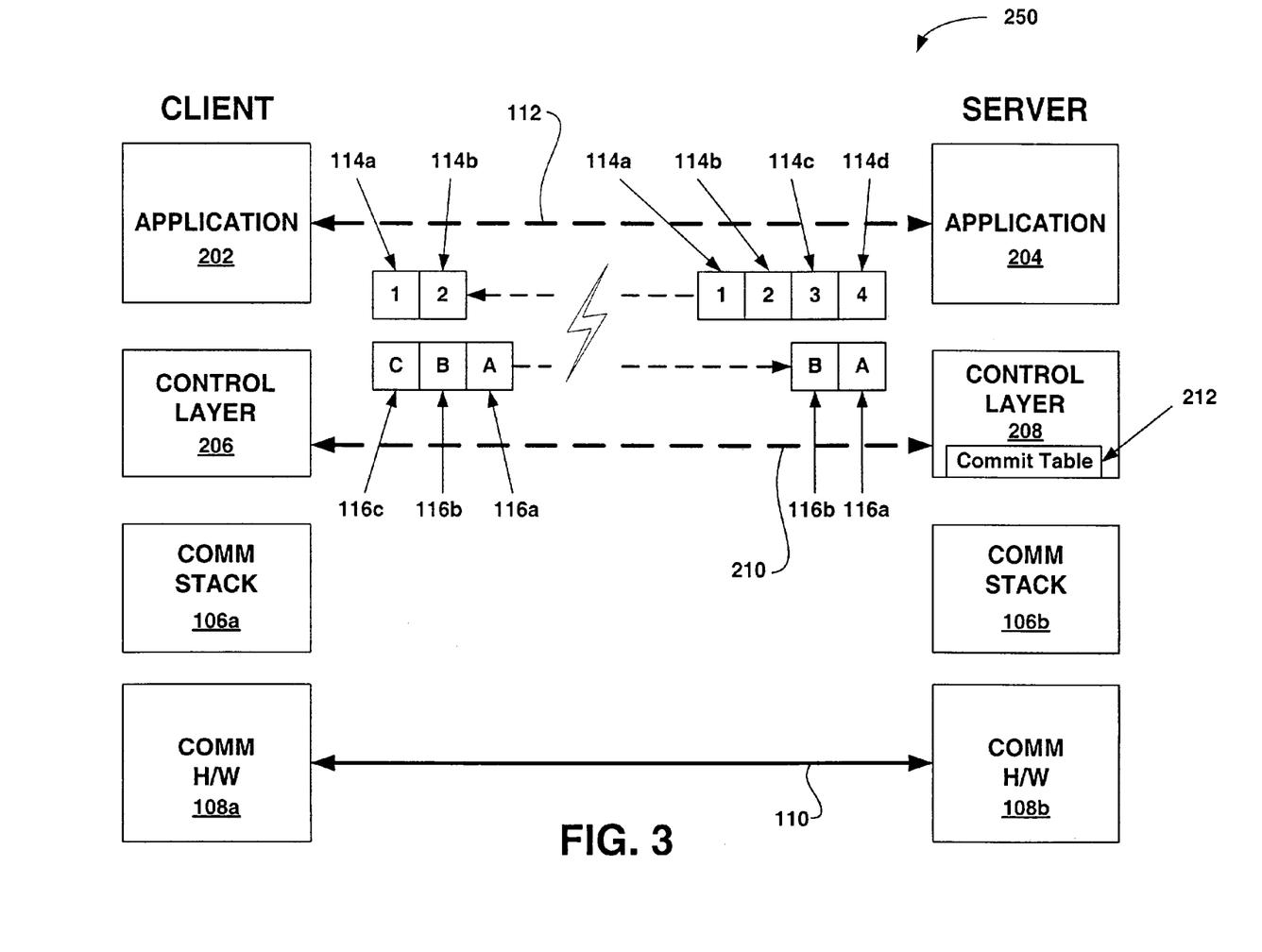
FIG. 3 is a block diagram showing a distributed computing environment having asynchronous fault-tolerance support for a two-way transaction, in accordance with an embodiment of the present invention.

FIG. 3 is a block diagram showing a distributed computing environment 250 having asynchronous fault-tolerance support for a two-way transaction, in accordance with an embodiment of the present invention. The distributed environment 250 includes a client application 202 executing on a client device, which is in communication with a server application 204 executing on a server device. As discussed previously, the client application 202 and server application 204 generally communicate using the logical connection 112.

During normal operation the client application 202 and server application 204 communicate with each other by sending data elements 114a–114d and 116a–116d to each other using the logical connection 112. As discussed above, the control layers 206 and 208 monitor the state of the connection during this communication. Upon detecting an interruption in the connection, the control layers 206 and 208 notify the applications 202 and 204 that an interruption has occurred.

As mentioned above, the control layer 208 periodically obtains a connection state value from the server applications 204 executing on the server device. To coordinate the connection state values for the server applications 204 executing on the server device, the control layer 208 utilizes a commit table 212 that stores the latest connection state value update for each application the commit table 212 services. In addition, the client control layer 206 can obtain connection state information from the client application 202 in either an asynchronous manner, as described above, or a synchronous manner in which the client application 202 provides a connection state value in response to being notified of the interruption.

For example, in FIG. 3, the server application 204 is transmitting data elements 1 114a, 2 114b, 3 114c, and 4 114d to the client application 202 using the logical connection 112. In addition, the client application 202 is transmitting data elements A 116a, B 116b, and C 116c to the server application 204 also using the logical connection 112. During the transmission an interruption occurs in the connection such that data can no longer be communicated over the logical connection 112. Upon detection of the connection interruption, the control layers 206 and 208 detect the connection interruption and notify the client application 202 and server application 204.

At this point, the client control layer 206 and the server control layer 208 establish a control connection 210 that allows the control layers 206 and 208 to communicate with each other. The control layers 206 and 208 utilize the same communication stacks 106a–106b and communication hardware 108a–108b for digital communication as utilized by the applications 202 and 204. Once the control connection 210 is established, the control layers exchange connection state values. For example, in FIG. 3, the server control layer 208 obtains the connection state value for the server application 204 from the last entry for the application 204 in the commit table 212. As discussed above, the client control layer 206 can obtain the connection state value from the client application 202 in either a synchronous manner or asynchronous manner.

In the example of FIG. 3, the client application 202 processed data elements 1 114a and 2 114b prior to the connection interruption. Hence, the client application 202 did not receive data elements 3 114c and 4 114d of the current transaction. As a result, the client control layer 206 obtains a connection state value of two from the client application 202, indicating two data elements were processed prior to interruption. In addition, prior to the interruption, the server application 204 processed data elements A 116a and B 116b and has updated the server control layer 208 with a connection state value of two, which was stored in the commit table 212. Hence, the server application 204 did not process data element C 116c of the current transaction.

Upon establishing the control connection 210, the client control layer 206 transmits its connection state value, in this example having a value of two, to the server control layer 208. Also, the server control layer 208 transmits its connection state value, in this example having a value of two, to the client control layer 206. The client control layer 206 then provides the connection state value information received from the server control layer 208 to the client application 202. Similarly, the server control layer 208 provides the connection state value information received from the client control layer 206 to the server application 204. At this point, the client control layer 206 passes control back to the client application 202 and the server control layer 208 passes control back to the server application 204.

Thereafter, the server application 204 can begin transmitting the remaining data elements of the transaction to the client application 202. In particular, the server application 204 begins transmitting from the data element at a point indicated by the connection state value received from the client control layer 206 plus one. In the example of FIG. 3, the server application 204 begins re-transmitting data starting from the third data element in the transaction (connection state value of two plus one), which is data element 3 114c, and continues with the remaining data element 4 114d. The client application 202 also begins transmitting the remaining data elements of the transaction to the server application 204. The client application 202 begins transmitting from the data element at a point indicated by the connection state value received from the server control layer 208 plus one. In the example of FIG. 3, the client application 202 begins re-transmitting data starting from the third data element in the transaction (connection state value of one plus one), which is data element C 116c. In addition to handling unintentional connection interruptions, embodiments of the present invention can handle intentional connection interruptions, such as when a communication channel is changed.

Figure 4:
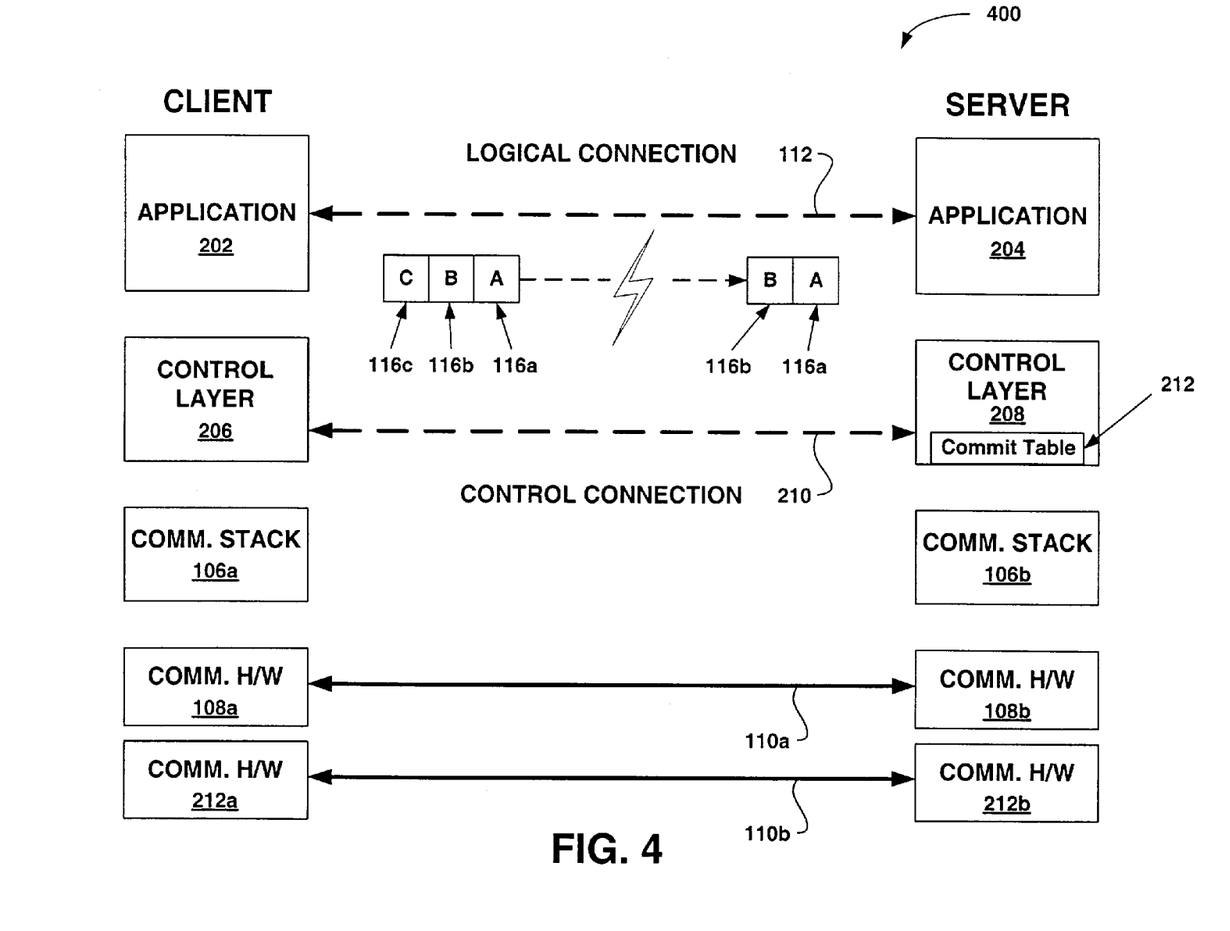
FIG. 4 is a block diagram showing a distributed computing environment having asynchronous fault-tolerance support and communication channel switching capability, in accordance with an embodiment of the present invention.

FIG. 4 is a block diagram showing a distributed computing environment 400 having asynchronous fault-tolerance support and communication channel switching capability, in accordance with an embodiment of the present invention. The distributed environment 400 includes a client application 202 executing on a client device, which is in communication with a server application 204 executing on a server device. As discussed previously, the client application 202 and server application 204 communicate using a logical connection 112.

As mentioned previously, the communication stacks 106a and 106b map logical connections to communication channels 110a and 110b, which include the actual communication hardware 108a and 108b. The communication stacks 106a and 106b handle data routing, flow control, buffering, error correction, and other computing issues encountered in real-world communication. Entities, such as the client application 202 and the server application 204, use one or more logical connections 112 to communicate with other entities by sending and receiving data in a sequential fashion over a period of time.

However, different communication channels 110a and 110b can perform differently. For example, although a cell phone based wireless communication channel is widely available, a cell phone based wireless communication channel generally performs much slower than a local 802.11b wireless connection. As such, network software can be capable of switching to faster communication channels when they become available. However, switching to a new communication channel interrupts any currently established connection using the previous communication channel. Advantageously, embodiments of the present invention can facilitate communication channel switching, allowing data transactions to continue from the point of interruption before the communication channels were changed.

For example, in FIG. 4 the client application 202 and server application 204 initiate a data transaction using a first communication 110a. That is, the communication stacks 106a and 106b map the logical connection 112 to communication channel 110a, which can be, for example, a cell phone based wireless network. During communication, the client device, for example, can enter an area having a better communication channel available. For example, if the client device were a telematics device incorporated into an automobile, the first communication channel 110a could be a cell phone based wireless network. Subsequently, the automobile can enter, for example, a home garage offering 802.11b wireless network connectivity using a second communication channel 110b. In this case, the communication stacks can remap the connection to the second communication channel 110b.

As mentioned above, the remapping of the connection causes an interruption in the logical connection 112. However, the control layers 206 and 208 monitor the state of the connection. Thus, upon detecting an interruption in the connection, the control layers 206 and 208 notify the applications 202 and 204 that an interruption has occurred and the applications can make appropriate responses. That is, the server application 204 can either terminate or continue to perform other functions not requiring the interrupted connection, such as further computations or data transmissions with other client devices. Since, as mentioned above, the server application 204 periodically updates the server control layer 208 with its current connection state value, the transaction can be later restarted from the point of the last connection state value update from the server application 204 to the control layer 208.

For example, in FIG. 4, the client application 202 is transmitting data elements A 116a, B 116b, and C 116c to the server application 204 using the logical connection 112. During the transmission the server application 204 periodically provides its connection state value to the server control layer 208, which updates the appropriate entry in the commit table 212 with the latest connection state value. At some point during the transmission the connection is interrupted to change from communication channel 110a to communication channel 110b. Upon detection of the connection interruption, the control layer 208 notifies the server application 204 of the interruption. In response, the server application 204 can either terminate or continue to perform other functions not requiring the interrupted connection, as described above.

When the communication channel change is complete the client control layer 206 and the server control layer 208 establish a control connection 210 that allows the control layers 206 and 208 to communicate with each other. At this point, the control layers exchange connection state values, for example of FIG. 4, the server application 202 processed data elements A 116a and B 116b prior to the connection interruption. During the transmission, the server application 204 periodically updates the server control layer 208 with its current connection state value. In this case, the server application 204 provides a connection state value of two to the server control layer 208. The connection state value of two indicates that the server application 204 has processed two data elements prior to the current update.

Upon establishing the control connection 210, the server control layer 208 transmits the connection state value, in this example having a value of two, to the client control layer 206. The client control layer 206 then provides the connection state value information to the client application 202. At this point, the client control layer 206 passes control back to the client application 202 and the server control layer 208 passes control back to the server application 204. As above, the client application 202 can begin transmitting the remaining data elements of the transaction to the server application 204 beginning from the data element at a point indicated by the connection state value plus one. In the example of FIG. 4, the client application 202 begins re-transmitting data starting from the third data element in the transaction (connection state value of two plus one), which is data element C 116c.

Figure 5:
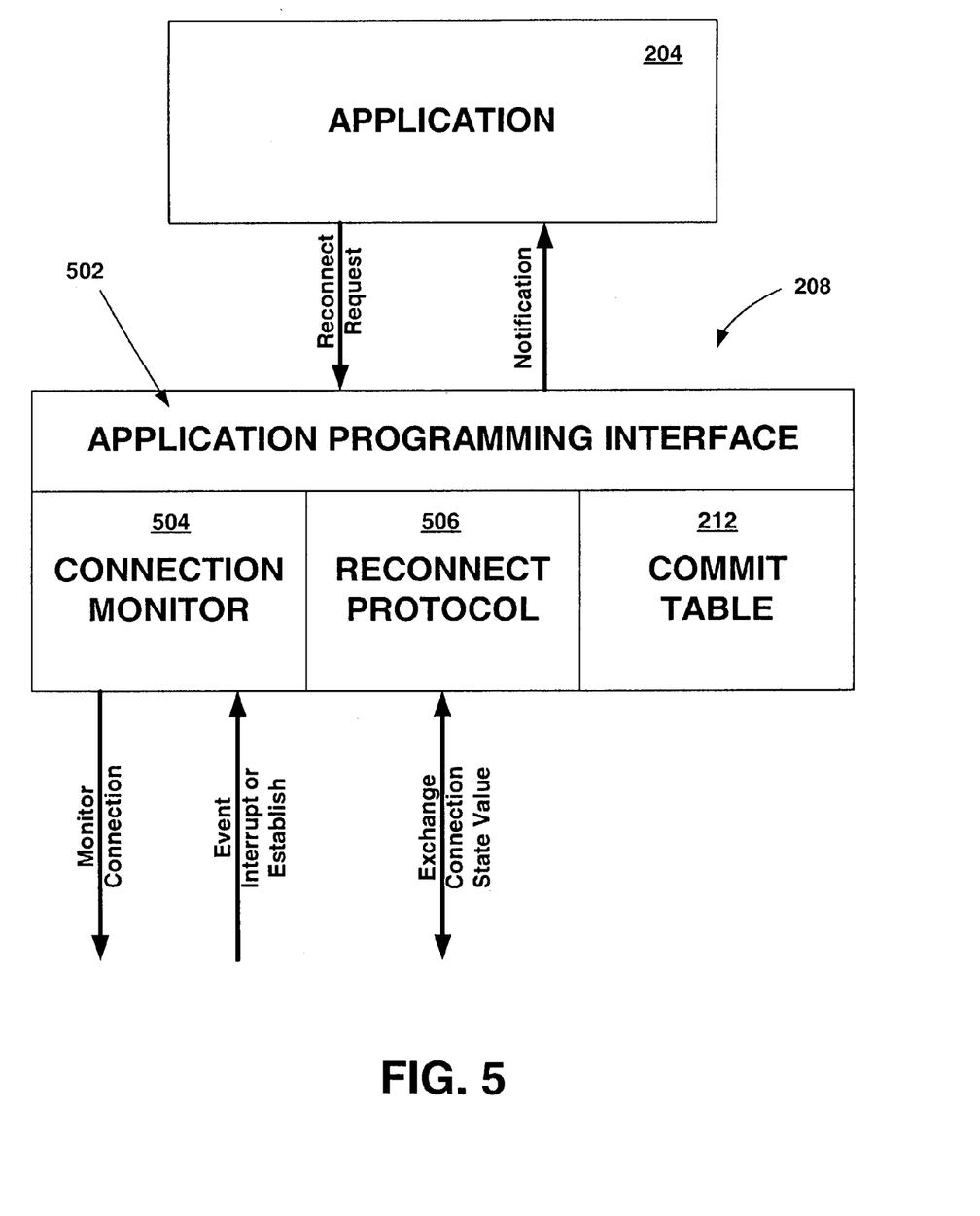
FIG. 5 is a block diagram illustrating the interfaces of an asynchronous based control layer, in accordance with an embodiment of the present invention.

FIG. 5 is a block diagram illustrating the interfaces of an asynchronous based control layer, in accordance with an embodiment of the present invention. As shown in FIG. 5, the control layer 208 communicates with the application 204 using an application programming interface (API) 502. The control layer 208 communicates with the communication stack using a connection monitor 504 and a reconnect protocol 506. In addition, connection state values for the various server applications 204 executing on the server device are stored in a commit table 212.

The commit table 212 stores connection state values from server applications 204 executing on the server device. As discussed above, many server applications 204 can be executed concurrently on the server device. Each server application 204 periodically provides its current connection state value to the server control layer 208 during execution. The server control layer 208 then stores each connection state value in the commit table 212 using an entry corresponding to the appropriate application. In this manner, when a connection interruption occurs, the last connection state value stored for the server application 204 can be obtained from the commit table 212.

The connection monitor 504 monitors the status of the connection and detects any interruption of communication on the connection. As mentioned above, the connection can be interrupted for many different reasons, including signal drops or fades, and communication channel changing. When the connection monitor 504 detects an interruption in the connection, the connection monitor 504 notifies the application 204 of the interruption using the API 502. If the application 204 was transmitting data to another endpoint, the application 204 stops transmitting data. Also, if the application was receiving data from another endpoint, it stops receiving data.

The connection monitor 504 then monitors the connection to detect when the connection has been reestablished. Once the connection is reestablished, the reconnect protocol 506 transmits information to the opposite control layer indicating that a 'reconnect' is about to occur. In addition, the reconnect protocol 506 transmits the connection state value for the specific application 204 obtained from the commit table 212 to the opposite control layer. The opposite control layer can respond with a connection state value of an application at the opposite endpoint.

The API 502 then notifies the application 204 that the connection has been reestablished. In addition, if the opposite control layer responded with a connection state value of the endpoint, API 502 provides opposite endpoint's connection state value to the application 204. At this point, the application 204 can restart, if it was terminated, or continue to perform its work. That is, if the application 204 was sending data over the connection, the application can continue sending data elements to the opposite endpoint starting from the point indicated by the connection state value received from the opposite endpoint. If the application 204 was receiving data over the connection, the application 204 will begin receiving data from the opposite endpoint starting with the data element immediately following the last data that was processed before the connection was interrupted.

Figure 6:
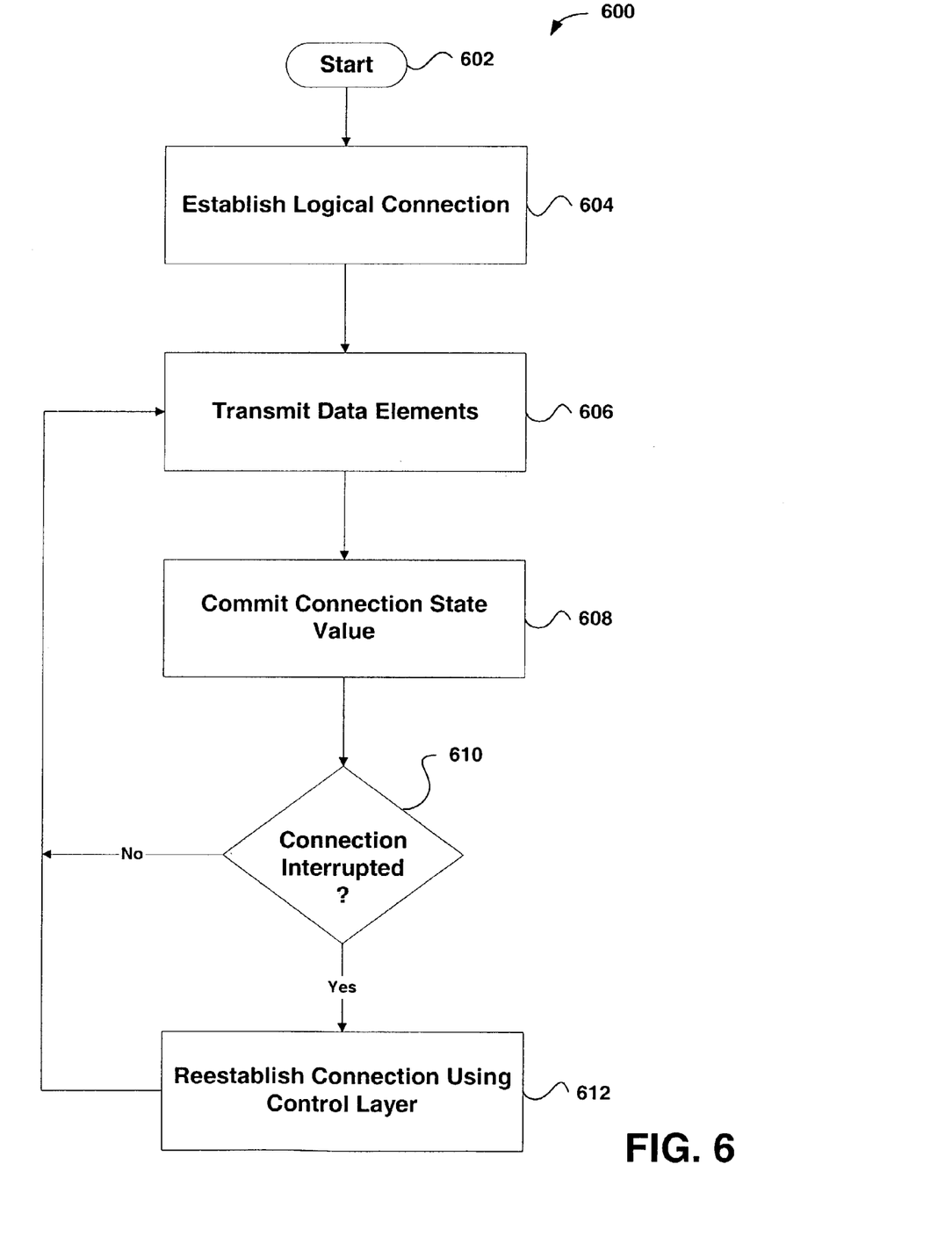
FIG. 6 is a flowchart showing a method for providing asynchronous fault-tolerant and adaptive communication in a distributed computing environment, in accordance with an embodiment of the present invention.

FIG. 6 is a flowchart showing a method 600 for providing asynchronous fault-tolerant and adaptive communication in a distributed computing environment, in accordance with an embodiment of the present invention. In an initial operation 602, preprocess operations are performed. Preprocess operations can include mapping a physical communication channel to a logical connection, executing a client application and a server application, and other preprocess operations that will be apparent to those skilled in the art after a careful reading of the present disclosure.

In operation 604, a logical connection is established between applications on opposite endpoints of a network. A typical distributed environment can include, for example, a client application executing on a client device, which is in communication with a server application executing on a server device. The client application and server application generally communicate using a logical connection, which is a logical entity used by applications to exchange data between two endpoints, such as the client application and the server application. Although the application programs function as though the logical connection were a physical entity, the logical connection requires a communication channel to actually transmit data, as discussed in greater detail previously.

The applications then begin transmitting data elements to each other, in operation 606. Applications generally communicate over a network by sending a sequential stream of data elements to the other application. As mentioned above, the data elements can be any discrete grouping of data, such as a byte of data, a group of data bytes, an object, a group of objects, or any other discrete data grouping utilized by an application.

In operation 608, the application commits its connection state value with the control layer. As discussed previously, the application periodically provides its current connection state value, indicating the number of data elements processed by the application, to the control layer. The control layer then stores the connection state value using a commit table. In this manner, when a connection failure occurs the most recent connection state value for the application can be retrieved from the commit table and provided to the opposite control layer.

A decision is then made as to whether the logical connection has been interrupted, in operation 610. A connection monitor monitors the status of the connection and detects any interruption of communication on the connection. As mentioned above, the connection can be interrupted for many different reasons, including signal drops or fades, and communication channel changing. If the logical connection has been interrupted, the method branches to operation 612. Otherwise, the method 600 continues with another transmit data elements operation 606.

In operation 612, the connection is reestablished using the control layer. Broadly speaking, the control layers obtain connection state values, indicating the number of data elements processed each application, from the respective applications during execution. The control layers exchange the connection state values with each other when reestablishing interrupted connections. In this manner, remaining data elements of the transaction can be sent sequentially over the network from the opposite endpoint beginning with the data element at the point indicated by the connection state values plus one. Connection reestablishment will be described in greater detail with reference to FIG. 8 below.

Advantageously, using the embodiments of the present invention, applications at both endpoints of a connection are able to reestablish communication at the point of the last connection value update from the server application to the control layer. In addition, the applications only need to resend the minimal amount of data required, regardless of the underlying communication mechanism and protocols.

Figure 7:
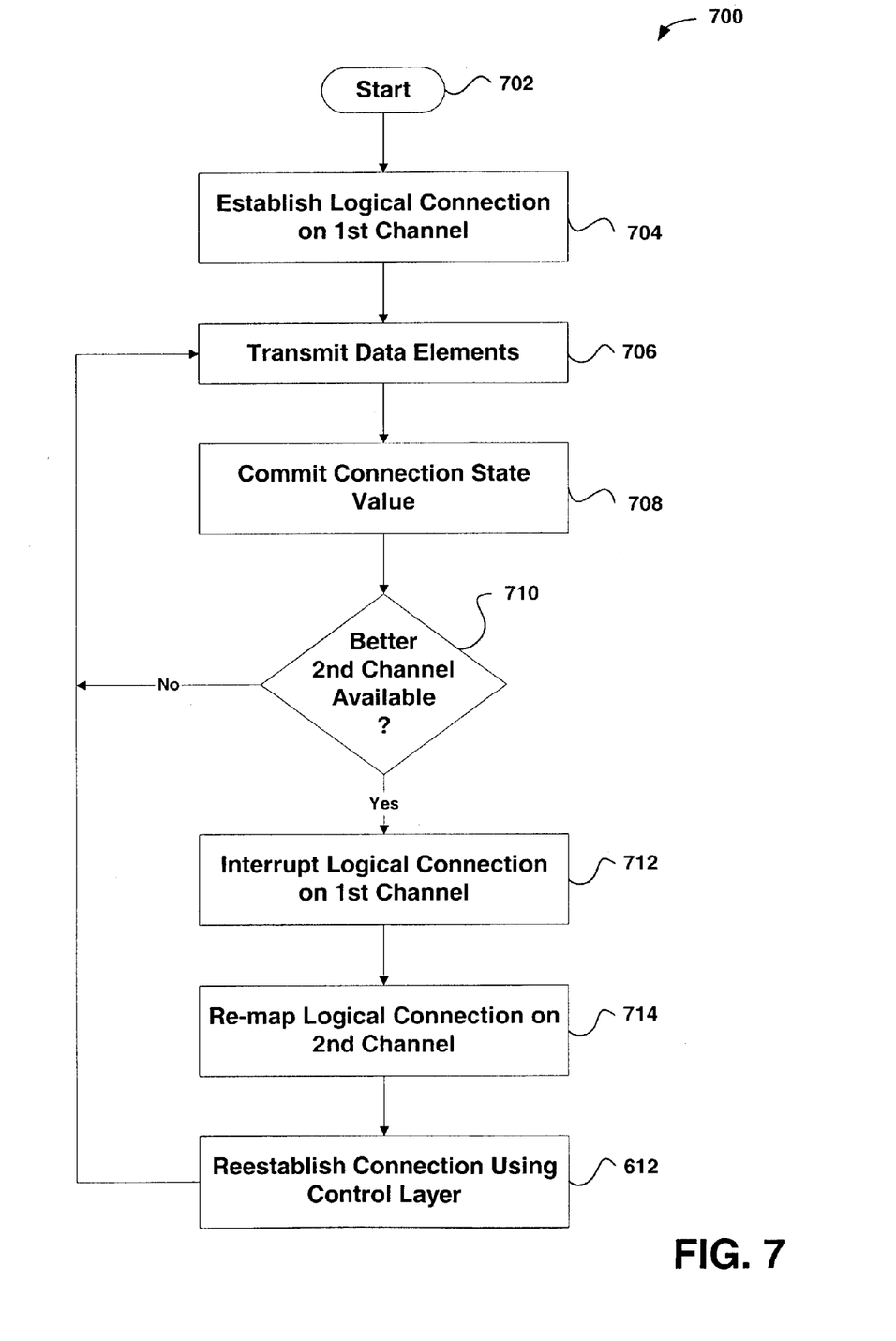
FIG. 7 is a flowchart showing a method for providing asynchronous fault-tolerant and adaptive communication when switching communication channels in a distributed computing environment, in accordance with an embodiment of the present invention.

FIG. 7 is a flowchart showing a method 700 for providing asynchronous fault-tolerant and adaptive communication when switching communication channels in a distributed computing environment, in accordance with an embodiment of the present invention. In an initial operation 702, preprocess operations are performed. Preprocess operations can include mapping a physical communication channel to a first logical connection, executing a client application and a server application, and other preprocess operations that will be apparent to those skilled in the art after a careful reading of the present disclosure.

In operation 704, a logical connection is established between applications on opposite endpoints of a network using a first communication channel. As mentioned previously, the communication stacks map logical connections to communication channels. The communication stacks handle data routing, flow control, buffering, error correction, and other computing issues encountered in real-world communication. Entities, such as the client application and the server application, use one or more logical connections to communicate with other entities by sending and receiving data in a sequential fashion over a period of time.

The applications then begin transmitting data elements to each other, in operation 706. Applications generally communicate over a network by sending a sequential stream of data elements to the other application. As mentioned above, the data elements can be any discrete grouping of data, such as a byte of data, a group of data bytes, an object, a group of objects, or any other discrete data grouping utilized by an application.

In operation 708, the application commits its connection state value with the control layer. As discussed previously, the application periodically provides its current connection state value, indicating the number of data elements processed by the application, to the control layer. The control layer then stores the connection state value using a commit table. In this manner, when a connection failure occurs the most recent connection state value for the application can be retrieved from the commit table and provided to the opposite control layer.

A decision is then made as to whether a better communication channel is available, in operation 710. Different communication channels can perform differently. For example, although cell phone based wireless communication channel are widely available, a cell phone based wireless communication channel generally performs much slower than a local 802.11b wireless connection. As such, network software can be capable of switching to faster communication channels when they become available. However, switching to a new communication channel interrupts any currently established connection using the previous communication channel. Advantageously, embodiments of the present invention can facilitate communication channel switching, allowing data transactions to continue from the point of interruption before the communication channels were changed. If a better, second communication channel is available, the method 700 branches to operation 712. Otherwise, the method 700 continues to transmit data elements in operation 706.

In operation 712, the logical connection on the first communication channel is interrupted. During communication, the client device can enter an area having a better communication channel available. For example, if the client device is a telematics device incorporated into an automobile, the first communication channel could be a cell phone based wireless network. Subsequently, the automobile can enter, for example, a home garage offering 802.11b wireless network connectivity using a second communication channel. In this case, the logical connection is interrupted on the first communication channel to allow the connection to be changed to the second communication channel, as described next.

The logical connection is re-mapped to the better, second communication channel, in operation 714, and the connection is reestablished using the control layer in operation 612. As mentioned above, the control layers obtain connection state values, indicating the number of data elements processed each application, from the respective applications. The control layers then exchange the connection state values with each other once the connection is re-mapped to the second communication channel. In this manner, remaining data elements of the transaction can be sent sequentially over the network from the opposite endpoint beginning with the data element at the point indicated by the connection state values plus one.

Figure 8:
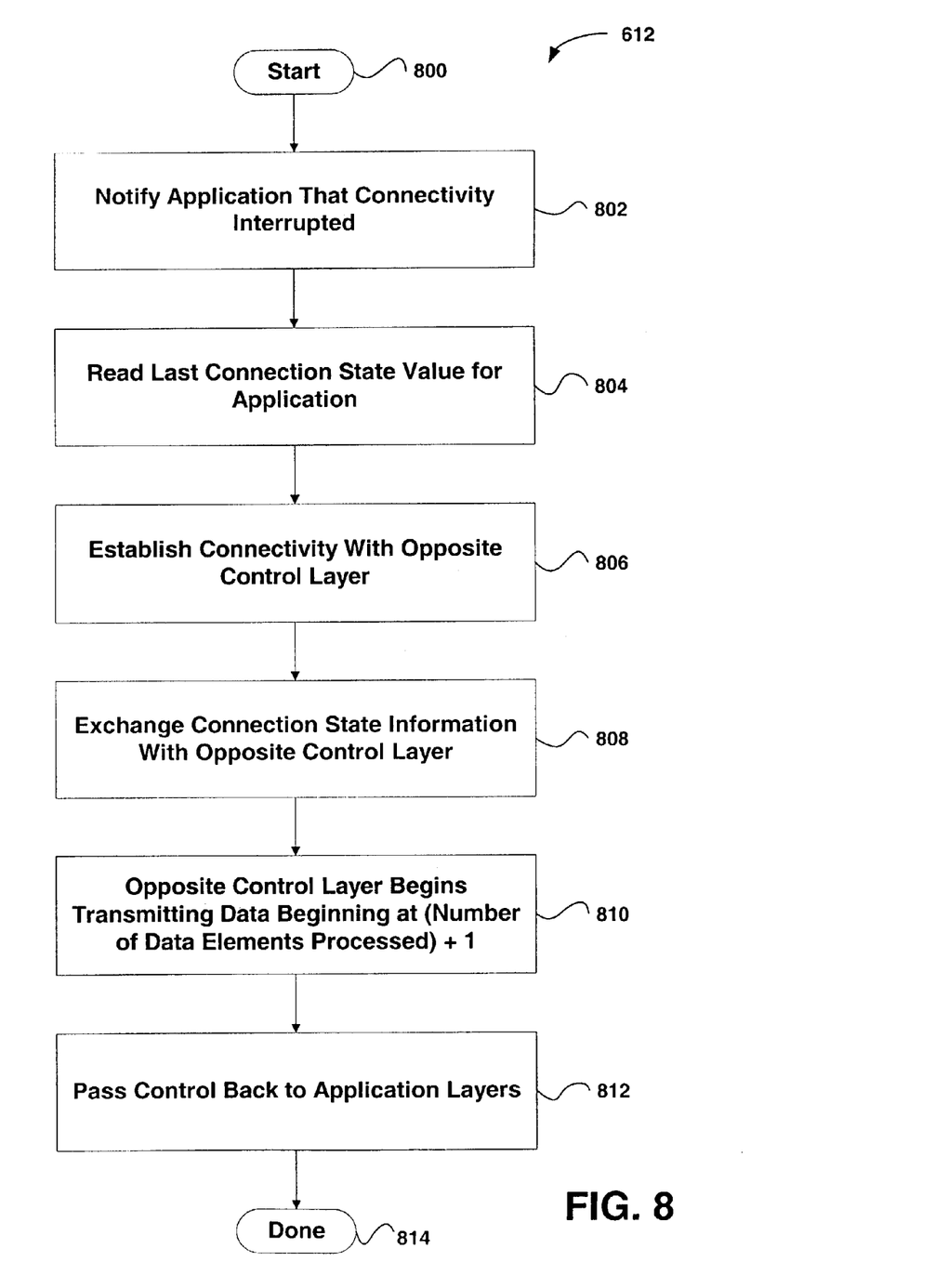
FIG. 8 is a flowchart showing method for reestablishing a connection using a control layer, in accordance with an embodiment of the present invention.

FIG. 8 is a flowchart showing method 612 for reestablishing a connection using a control layer, in accordance with an embodiment of the present invention. In an initial operation 800, preprocess operations are performed. Preprocess operations can include detecting a connection interruption, re-mapping a logical connection to another communication channel, and other preprocess operations that will be apparent to those skilled in the art after a careful reading of the present disclosure.

In operation 802, the application is notified that connectivity is interrupted. Embodiments of the present invention utilize a connection monitor to monitor the status of the connection and detect any interruption of communication on the connection. When the connection monitor detects an interruption in the connection, the connection monitor notifies the application of the interruption using the API. If the application was transmitting data to another endpoint, the application stops transmitting data. Also, if the application was receiving data from another endpoint, it stops receiving data.

The last connection state value stored from the application is read from the commit table, in operation 804. The connection state value indicates the number of data elements processed by the application at the time the last commit table update. As mentioned previously, the data elements can be any discrete grouping of data, such as a byte of data, a group of data bytes, an object, a group of objects, or any other discrete data grouping utilized by an application.

In operation 806, connectivity is reestablished with the opposite control layer. In particular, the two client control layers establish a control connection that allows the control layers to communicate with each other. The control layers utilize the same communication stacks and communication hardware for digital communication as utilized by the applications.

Once the control connection is established, the control layers exchange connection state values, in operation 808.

As mentioned above, connection state values are values indicating the number of data elements processed by each application up to the point of interruption in a digital connection. The data elements, as previously discussed, can be any discrete grouping of data, such as a byte of data, a group of data bytes, an object, a group of objects, or any other discrete data grouping utilized by an application.

Thereafter, the opposite control layer can begin transmitting data elements, beginning at the received connection state value plus one, in operation 810. Also, control is passed back to the application layers, in operation 812, and post process operations are performed in operation 814. Post process operations can include, for example, transmitting additional data elements, changing communication channels, and other post process operations that will be apparent to those skilled in the art after a careful reading of the present disclosure. Thus, embodiments of the present invention advantageously allow applications at both endpoints of a connection to reestablish communication at the precise point where the interruption occurred, regardless of the underlying communication mechanism and protocols. In addition, the applications only need to resend the minimal amount of data required.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing asynchronous fault-tolerant and adaptive communication in a distributed computing environment, comprising:
   periodically updating a stored connection state value received from an application, the connection state value indicating a number of data elements processed by the application;
   detecting an interruption in a digital connection being utilized to transmit data elements of a transaction sequentially from an opposite endpoint to the application running at one endpoint;
   establishing a control connection on the network between the two endpoints upon the interruption in the digital connection;
   exchanging the stored connection state value with the opposite endpoint using the control connection on the network; and
   receiving remaining data elements of the transaction sequentially over the network from the opposite endpoint, wherein the remaining data elements begin with a data element at a point indicated by the connection state value plus one.

2. A method as recited in claim 1, further comprising the operations of:
   receiving an opposite connection state value indicating a number of data elements processed using the opposite endpoint; and
   transmitting remaining data elements sequentially over the network to the opposite endpoint, wherein the remaining data elements begin with a data element at a point indicated by the opposite connection state value plus one.

3. A method as recited in claim 1, further comprising the operation of notifying the application that an interruption has occurred.

4. A method as recited in claim 1, further comprising the operation of storing the connection state value in a table, the table having entries for connection state values from a plurality of applications.

5. A method as recited in claim 4, further comprising the operation of passing control back to the application after exchanging state information with the opposite endpoint.

6. A method as recited in claim 1, wherein the application is a server application and the opposite endpoint is a client application.

7. A method as recited in claim 1, further comprising the operation of detecting a $2^{nd}$ communication channel, the $2^{nd}$ communication channel providing an alternate option of communication between the two endpoints that is different from a current $1^{st}$ communication channel.

8. A method as recited in claim 7, further comprising the operations of:
   interrupting the digital connection on the current $1^{st}$ communication channel; and
   re-mapping a logical connection to the $2^{nd}$ communication channel.

9. A computer program embodied on a computer readable medium having program instructions for providing asynchronous fault-tolerant and adaptive communication in a distributed computing environment, comprising:
   a connection monitor module that detects an interruption in a digital connection on a network between two endpoints, the digital connection being utilized to transmit data elements of a transaction sequentially from an opposite endpoint to an application;
   a commit table that stores a connection state value indicating a number of data elements processed by the application, the connection state value being periodically updated during execution of the application; and
   a reconnect protocol module that exchanges the connection state value with the opposite endpoint using a control communication on the network, wherein the control communication is established between the two endpoints upon detecting an interruption in the digital connection, wherein remaining data elements of the transaction are received sequentially over the network from the opposite endpoint beginning with a data element at a point indicated by the stored connection state value plus one.

10. A computer program as recited in claim 9, wherein the reconnect protocol module further receives an opposite connection state value indicating a number of data elements processed using the opposite endpoint.

11. A computer program as recited in claim 10, wherein the application transmits remaining data elements sequentially over the network to the opposite endpoint, and wherein the remaining data elements begin with a data element at a point indicated by the opposite connection state value plus one.

12. A computer program as recited in claim 9, further comprising an application programming interface that notifies the application that an interruption has occurred.

13. A computer program as recited in claim 9, wherein the application programming interface periodically receives the connection state value from the application and provides the connection state value to the commit table.

14. A computer program as recited in claim 9, wherein an endpoint is a server application and the opposite endpoint is a client application.

15. A computer program as recited in claim 9, wherein the connection monitor module detects a $2^{nd}$ communication channel, the $2^{nd}$ communication channel providing an alternate option of communication between the two endpoints that is different from a current $1^{st}$ communication channel.

16. A computer program as recited in claim 15, wherein the connection monitor module interrupts the digital connection on the current $1^{st}$ communication channel and re-maps a logical connection to the $2^{nd}$ communication channel.

17. A distributed environment having a synchronous fault-tolerant and adaptive communication, comprising:
   a client application in communication with a client control layer;
   a server application having logical connection with the client application, the logical connection being utilized to transmit data elements of a transaction sequentially from the client application to the server application; and
   a server control layer having a table that stores a server connection state value indicating a number of data elements processed by the server application, wherein the server control layer establishing a control connection with the client control layer upon detection of an interruption in the logical connection, wherein the server control layer exchanges the server connection state value with the client control layer using the control connection when the logical connection is interrupted.

18. A distributed environment as recited in claim 17, wherein the client application transmits remaining data elements of the transaction sequentially over the network beginning with a data element at a point indicated by the server connection state value plus one.

19. A distributed environment as recited in claim 18, wherein the client control layer exchanges a client connection state value with the server control layer using the control connection upon detecting an interruption in the logical connection, the client connection state value indicating a number of data elements processed using the client application.

20. A distributed environment as recited in claim 19, wherein the server application transmits remaining data elements sequentially over the network to the client application beginning with a data element at a point indicated by the client connection state value plus one.

* * * * *